US 8,181,195 B2

(12) United States Patent
Sardera

(10) Patent No.: US 8,181,195 B2
(45) Date of Patent: May 15, 2012

(54) ANONYMOUS AGGREGATED DATA COLLECTION

(75) Inventor: Esteban Sardera, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 60 days.

(21) Appl. No.: 12/259,225

(22) Filed: Oct. 27, 2008

(65) Prior Publication Data

US 2009/0055852 A1 Feb. 26, 2009

Related U.S. Application Data

(63) Continuation of application No. 10/171,200, filed on Jun. 11, 2002, now Pat. No. 7,444,655.

(51) Int. Cl.
*H04H 60/32* (2008.01)
(52) U.S. Cl. .................. 725/14; 725/9; 725/10; 725/11; 725/12; 725/13
(58) Field of Classification Search .................. 725/9–14
See application file for complete search history.

(56) References Cited

U.S. PATENT DOCUMENTS

| 5,835,087 | A  | * | 11/1998 | Herz et al. ..................... 715/810 |
| 7,197,472 | B2 | * | 3/2007  | Conkwright et al. ........... 705/10 |
| 7,587,728 | B2 | * | 9/2009  | Wheeler et al. ................. 725/19 |
| 2002/0120925 | A1 | * | 8/2002 | Logan ............................... 725/9 |
| 2003/0037187 | A1 |   | 2/2003 | Hinton et al. |
| 2003/0066070 | A1 | * | 4/2003 | Houston .......................... 725/9 |
| 2003/0172374 | A1 | * | 9/2003 | Vinson et al. .................... 725/9 |
| 2004/0025174 | A1 | * | 2/2004 | Cerrato ........................... 725/9 |

* cited by examiner

*Primary Examiner* — Pankaj Kumar
*Assistant Examiner* — Charles N Hicks
(74) *Attorney, Agent, or Firm* — Lee & Hayes, PLLC

(57) ABSTRACT

An anonymous aggregated data collection system aggregates media access information in an anonymous data collection component without associating the media access information with any one particular client device. The anonymous data collection component further prevents a network operator, content provider, or third party from correlating the media access information obtained from a client device with any one particular subscriber by comparing a unique identifier of the client device with corresponding subscription account and subscriber personal identification information.

29 Claims, 6 Drawing Sheets

ANONYMOUS AGGREGATED DATA COLLECTION

RELATED APPLICATION

This application is a continuation of and claims priority to U.S. patent application Ser. No. 10/171,200, filed on Jun. 11, 2002, the disclosure of which is incorporated by reference herein. Any disclaimer that may have occurred during the prosecution of the above-referenced application(s) is hereby expressly rescinded, and reconsideration of all art considered therein is respectfully requested.

TECHNICAL FIELD

This invention relates to television entertainment and information architectures and, in particular, to anonymous aggregated data collection systems and methods.

BACKGROUND

A consumer who subscribes to receive broadcast and/or interactive television entertainment and information has a client receiving device, typically in a home or place of business, that is configured to receive the broadcast television entertainment and information in the form of video and audio content from a television-based broadcast system. A network operator implements the television-based broadcast system to deliver the video and audio content over a cable and/or satellite distribution system to the subscribers. Additionally, a client device, such as a digital video recorder or a personal video recorder, can receive video content in the form of on-demand entertainment, such as movies. A digital or personal video recorder includes a hard disk memory so that a viewer can record the video content and other content of interest to the viewer and/or implement digital rights management technology for on-demand entertainment.

A network operator that provides both the client receiving devices and the viewing content to subscribers in a broadcast and interactive television-based system can implement that the client devices log consumer viewing selections and choices, and communicate the collected information back to the network operator or to a third-party. Subscriber viewing selections and choices can include television broadcast viewing, on-demand video content viewing, interactive television and/or Internet browsing choices, interactive entertainment usage such as games, and any other type of media access. Network operators seek to collect consumer information relating to subscribers interactive selections and viewing choices to better determine which broadcast channels and types of content are preferred by how many of the subscribing viewers.

Additionally, a network operator can associate the collected information communicated from a client device with the corresponding subscription account, and further associate any personal and demographic information about a particular subscriber with the collected viewing information. This information can be utilized as a basis for subscription fees, content distribution fees charged to content providers, and as a basis for how much to charge for advertisements on particular channels at particular times during a broadcast day, depending upon which channels subscribers will most likely be watching.

Subscribers to a television-based system, however, have an expectation of privacy in any personal information associated with their subscription account, with selection choices when interacting with an interactive television system, and in their viewing choices, particularly in their home. Further, some privacy laws either restrict network operators from collecting consumer information, or require disclosing to subscribers that information about their viewing habits is being collected and additionally showing the subscribers what information has been collected.

In an effort to provide subscribers with a sense of privacy regarding interactive selections and media viewing choices, and/or in an effort to conform with privacy laws that restrict network operators from collecting consumer information, a network operator may contract with a third-party proxy to collect subscriber media viewing and interaction information. With this level of privacy control, however, subscribers must still rely on the network operator not to attempt to correlate the collected information with any corresponding subscription accounts. Further, subscribers must also rely on the contracted third-party to maintain the collected information in a manner that prevents disclosure of subscription account identifiers, such as the unique identifier corresponding to a client receiving device.

Accordingly, for television-based entertainment and information systems, there is a need for techniques to anonymously collect and aggregate subscriber information, such as interactive selections and media viewing choices, without disclosing to a network operator or to a third-party the identity of any one subscriber or associating the subscriber with any particular selections or choices.

SUMMARY

An anonymous aggregated data collection system aggregates media access information, which can include content viewing data and/or application usage data, in an anonymous data collection component without associating the media access information with any one particular client device in a television-based entertainment and information system. The anonymous data collection component further prevents a network operator, content provider, or third-party from correlating the media access information obtained from a client device with any one particular subscriber by comparing a unique identifier of the client device with corresponding subscription account and subscriber personal identification information.

BRIEF DESCRIPTION OF THE DRAWINGS

The same numbers are used throughout the drawings to reference like features and components.

DETAILED DESCRIPTION

An anonymous aggregated data collection system is described that aggregates media access information, which can include content viewing data, application usage data, and/or non-identifying viewer profile data in an anonymous data collection component without associating the media access information with any one particular client device in a television-based entertainment and information system. The anonymous data collection component further prevents a network operator, content provider, or third-party from correlating the media access information of any one client device with any particular subscriber by comparing a unique identifier of a client device with corresponding subscription account information.

The anonymous aggregated data collection system enables a network operator to collect and anonymously compile television viewing data, on-demand video content viewing data, interactive television and/or Internet browsing choices, interactive entertainment access data, and any other type of media access information to include information about content pre-cached for viewing on a hard disk memory of a digital video recorder or a personal video recorder. The network operator can utilize the media access information to compile accurate television ratings information for network program packaging decisions, targeted advertising, and for other related television-based entertainment and information systems broadcast decisions.

The following discussion is directed to television-based entertainment and information systems, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Exemplary System Architecture

Figure 1:
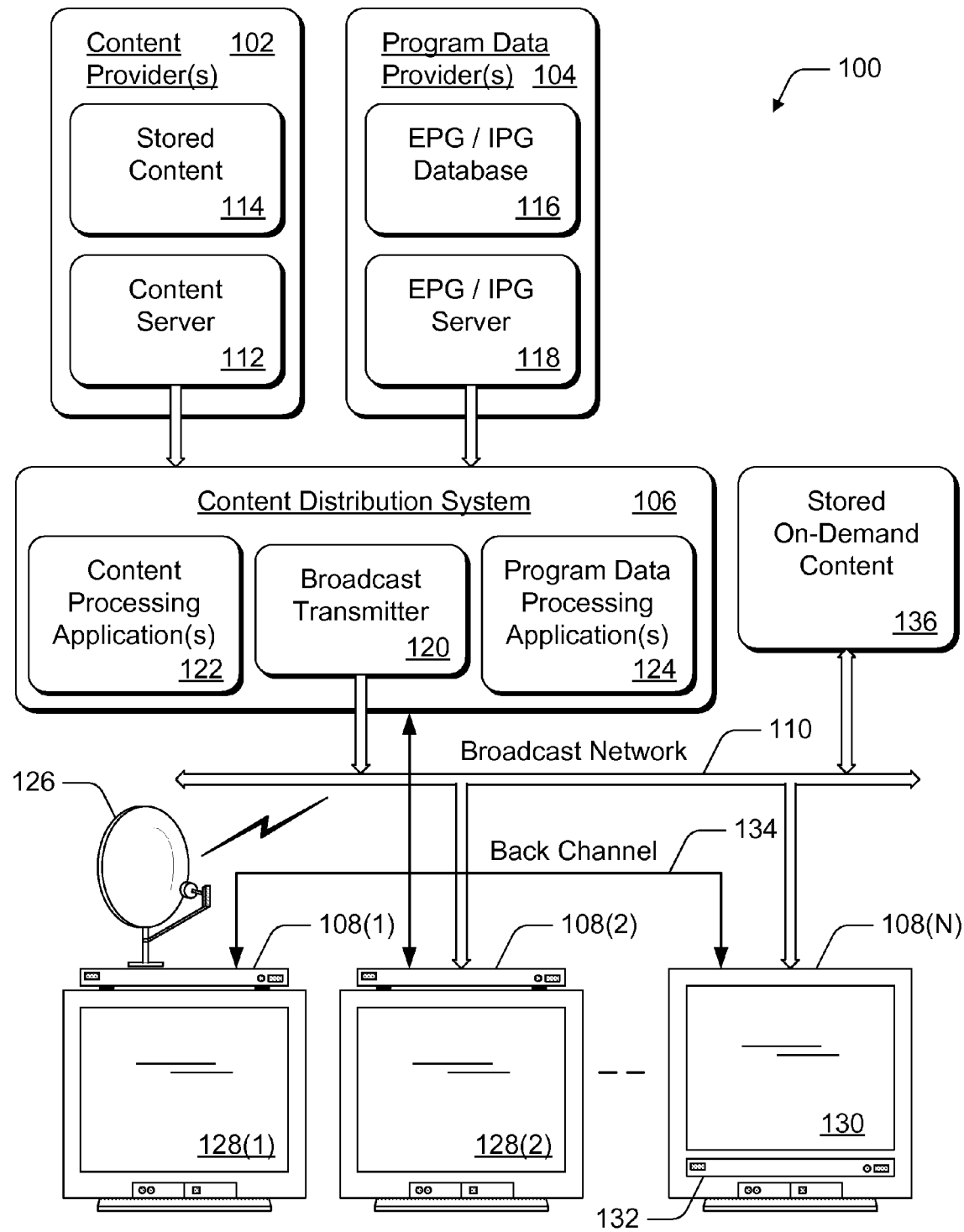
FIG. 1 illustrates an exemplary system architecture in which the systems and methods for an anonymous aggregated data collection system can be implemented.

FIG. 1 illustrates an exemplary television entertainment system 100 that is an architecture in which an anonymous aggregated data collection system can be implemented. System 100 facilitates distribution of content and program data to multiple viewers, and further facilitates anonymously collecting and aggregating system subscriber interactive choices and viewing selections. The system 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 112 controls distribution of live content (e.g., content that was not previously stored, such as live feeds) and/or content stored at other locations to the content distribution system 106. Program data provider 104 includes an electronic program guide (EPG) and/or interactive program guide (IPG) database 116 and an EPG and/or IPG server 118. The program guide database 116 stores electronic files of program data which is used to generate an electronic or interactive program guide (or, "program guide"). Program data (or, "EPG data", or "IPG data") includes program titles, ratings, characters, descriptions, actor names, station identifiers, channel identifiers, schedule information, and so on. Program data may also include video on-demand content information, such as movie schedules, as well as application information, such as for interactive games, and other programming information that may be of interest to a viewer.

The program guide server 118 processes the program data prior to distribution to generate a published version of the program data which can contain programming information for all broadcast channels and on-demand content listings for one or more days. The processing may involve any number of techniques to reduce, modify, or enhance the program data. Such processes might include selection of content, content compression, format modification, and the like. The program guide server 118 controls distribution of the published version of the program data from program data provider 104 to the content distribution system 106 using, for example, a file transfer protocol (FTP) over a TCP/IP network (e.g., Internet or Intranet). Further, the published version of the program data can be transmitted from program data provider 104 via a satellite and the content distribution system 106 directly to a client device 108.

Content distribution system 106 includes a broadcast transmitter 120, one or more content processing applications 122, and one or more program data processing applications 124. Broadcast transmitter 120 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

A content processing application 122 processes the content received from content provider 102 prior to transmitting the content across broadcast network 110. Similarly, a program data processing application 124 processes the program data received from program data provider 104 prior to transmitting the program data across broadcast network 110. A particular content processing application 122 may encode, or otherwise process, the received content into a format that is understood by the multiple client devices 108(1), 108(2), . . . , 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service that provides EPG and/or IPG data, as well as content, to multiple subscribers. Each content distribution system 106 may receive a slightly different version of the program data that takes into account different programming preferences and lineups. The program guide server 118 can create different versions of an electronic or interactive program guide that includes those channels of relevance to respective headend services, and the content distribution system 106 transmits the electronic or interactive program guide data to the multiple client devices 108(1), 108(2), . . . , 108(N). In one implementation, for example, content distribution system 106 utilizes a carousel file system to repeatedly broadcast the program data over an out-of-band (OOB) channel to the client devices 108. Alternatively, the multiple client devices 108(1), 108(2), . . . , 108(N) can receive standard, or uniform, program data and individually determine the program data to display based on the associated headend service.

Client devices 108 can be implemented in a number of ways. For example, a client device 108(1) receives broadcast content from a satellite-based transmitter via a satellite dish 126. Client device 108(1) is also referred to as a set-top box or a satellite receiving device. Client device 108(1) is coupled to a television 128(1) for presenting the content received by the client device (e.g., audio data and video data), as well as a graphical user interface. A particular client device 108 can be coupled to any number of televisions 128 and/or similar devices that can be implemented to display or otherwise render content. Similarly, any number of client devices 108 can be coupled to a single television 128.

Client device 108(2) is also coupled to receive broadcast content from broadcast network 110 and provide the received content to associated television 128(2). Client device 108(N) is an example of a combination television 130 and integrated set-top box 132. In this example, the various components and functionality of the set-top box are integrated into the television, rather than using two separate devices. The set-top box integrated into the television can receive broadcast signals via a satellite dish (similar to satellite dish 126) and/or via broadcast network 110. In alternate implementations, client devices 108 may receive broadcast signals via the Internet or any other broadcast medium, such as back channel 134 which can be implemented as a Internet protocol (IP) or other protocol connection using a modem connection and conventional telephone line, for example. Further, back channel 134 provides an alternate communication link between each of the client devices 108, and between the client devices 108 and the content distribution system 106.

Each client device 108 can run an electronic or interactive program guide (EPG or IPG) application that utilizes the program data. A program guide application enables a television viewer to navigate through an onscreen program guide and locate television shows, video on-demand movies, interactive game selections, and other media access information or content of interest to the viewer. With a program guide application, the television viewer can look at schedules of current and future programming, set reminders for upcoming programs, and/or enter instructions to record one or more television shows or video on-demand movies.

The exemplary system 100 also includes stored on-demand content 136, such as Video On-Demand (VOD) movie content. The stored on-demand content can be viewed with a television 128 via a client device 108 through an onscreen movie guide, for example, and a viewer can enter instructions to stream a particular movie, or other stored content, down to a corresponding client device 108.

Exemplary Client Device

Figure 2:
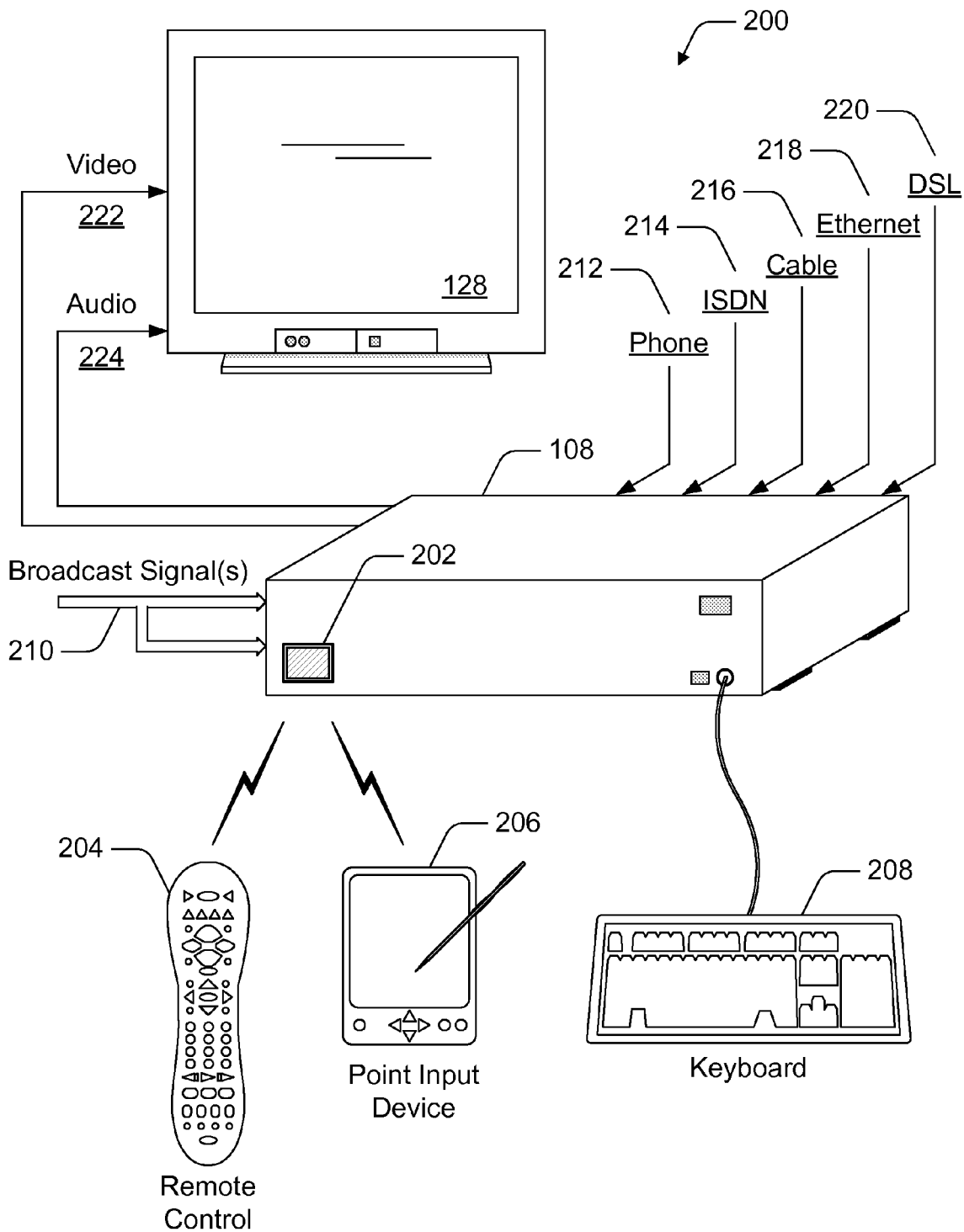
FIG. 2 illustrates an example client device, a television, and various input devices that interact with the client device.

FIG. 2 illustrates an exemplary implementation 200 of a client device 108 shown as a standalone unit that connects to a television 128. Client device 108 can be implemented in any number of embodiments, including as a set-top box, a satellite receiver, a TV recorder with a hard disk, a digital video recorder (DVR) and playback system, a personal video recorder (PVR) and playback system, a game console, an information appliance, and so forth.

Client device 108 includes a wireless port 202, such as an infrared (IR), 802.11, or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network, such as broadcast network 110 (FIG. 1). Client device 108 includes hardware and/or software for receiving and decoding broadcast signal 210, such as an NTSC, PAL, SECAM, or other television system analog video signal, as well as a DVB, ATSC, ARIB, or other television system digital video signal. Client device 108 also includes hardware and/or software for providing the user with a graphical user interface by which the user can, for example, access various network services and applications, configure the client device 108, and perform other functions.

Client device 108 can communicate with other devices via one or more connections including an 802.11 wireless transport via wireless connection 202, a conventional telephone line 212, an ISDN link 214, a cable link 216, an Ethernet link 218, a DSL link 220, and the like. Client device 108 may use any one or more of the various communication links 202 and 212-220 at a particular instant to communicate with any number of other devices.

Client device 108 generates video signal(s) 222 and audio signal(s) 224, both of which are communicated to television 128. The video signals and audio signals can be communicated from client device 108 to television 128 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

Exemplary Anonymous Aggregated Data Collection Systems

Figure 3:
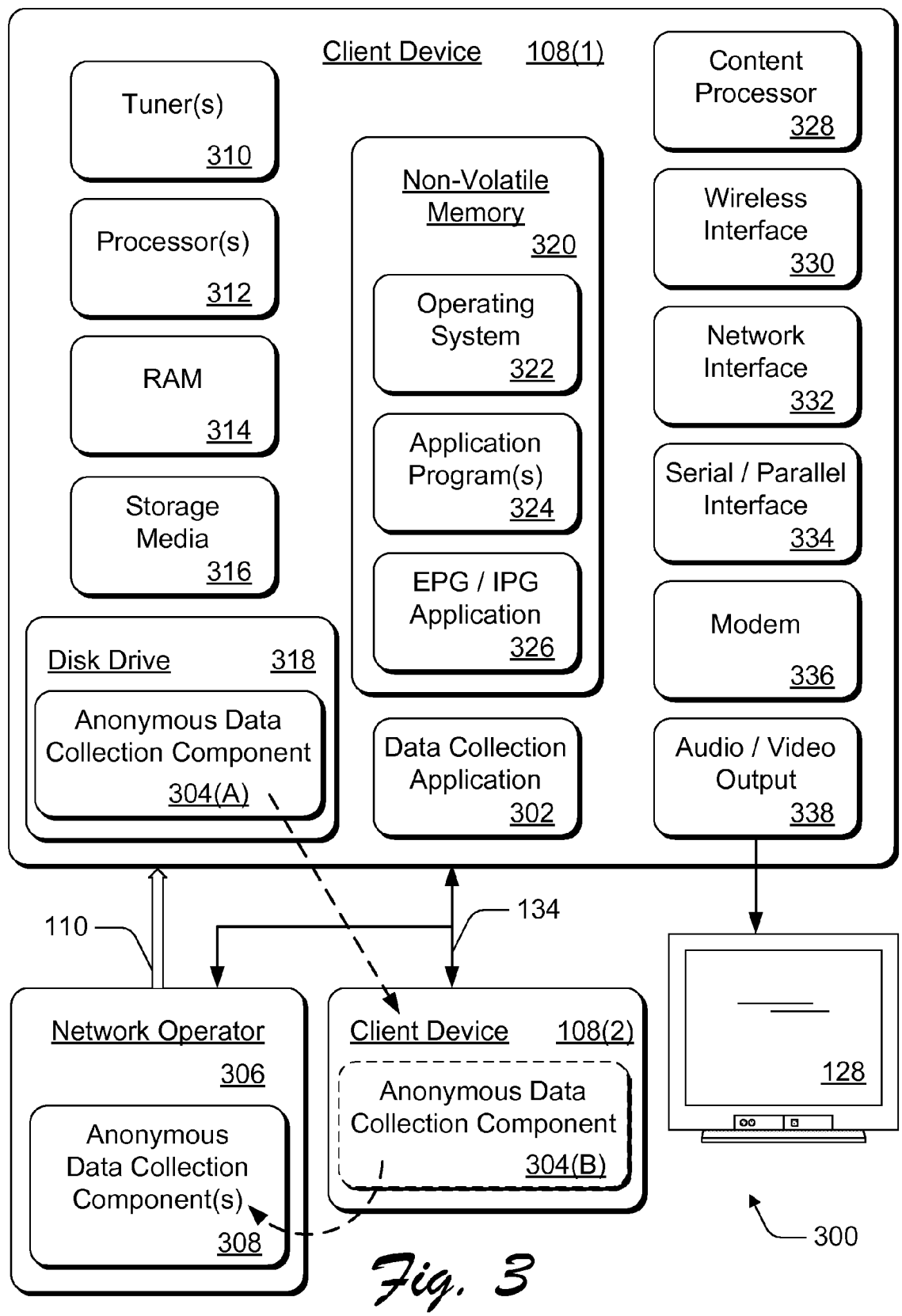
FIG. 3 illustrates various components of an exemplary client device implemented in an exemplary anonymous aggregated data collection system.

FIG. 3 illustrates an exemplary anonymous aggregated data collection system 300 that includes selected components of television system 100, such as exemplary client devices 108(1) and 108(2) as shown in FIGS. 1 and 2, and a television 128. Client device 108(1) also includes components to implement an anonymous aggregated data collection system to anonymously collect interactive choices and viewing selections of multiple subscribers to a television-based entertainment and information system.

A data collection application 302 can be configured to perform several functions of an anonymous aggregated data collection system, and can be implemented as a software component. Although data collection application 302 is illustrated and described as a single application configured to perform several functions, the data collection application 302 can be implemented as several component applications distributed to each perform one or more functions in a digital video recorder system, a personal video recorder system, and/or any other television-based entertainment and information system.

The data collection application 302 can be configured to track, or otherwise log, media access information which includes broadcast channels and on-demand video content that a viewer watches, interactive television and Internet browsing choices, interactive entertainment and application usage data, and any other related information. Other media access information can include Web content broadcast for viewing on a television, such as a still image of the local weather or a schedule of local events that may be of interest to the viewer.

The data collection application 302 creates an anonymous data collection component 304(A) to maintain the media access information of client device 108(1) along with media access information of additional client devices in the system 300. For example, data collection application 302 creates anonymous data collection component 304(A), stores media access information of client device 108(1) in the anonymous data collection component, and communicates the anonymous data collection component to client device 108(2) via communication link 134.

The data collection application 302 does not associate any client device 108(1) identifying information, such as a traceable unique identifier, with the stored media access information in the anonymous data collection component so that the aggregated media access information is anonymous. Further, any viewer profile data stored in the anonymous data collection component is also not associated with client device 108(1) to prevent correlating the viewer profile data with any one particular subscriber.

Viewer profile data can be obtained from information corresponding to a household demographic and/or corresponding to a login account, and can identify viewer age, gender, and other demographic information without disclosing the identity of a specific viewer. Additionally, data collection application 302 in client device 108(1) can receive an anonymous data collection component 304(B) from client device 108(2), add media access information of client device 108(1) to media access information of client device 108(2) in the anonymous data collection component, and determine whether to communicate the anonymous data collection component 304(B) to an additional client device or to a network operator 306.

Network operator 306 is an implementation of content distribution system 106 (FIG. 1) which is representative of a headend service that provides program data, as well as content, to multiple subscribers (i.e., client devices 108). When an anonymous data collection component has been communicated to each client device in a set of client devices, the anonymous data collection component is routed to network operator 306 where multiple anonymous data collection component(s) 308 from multiple sets of client devices are combined to aggregate the media access information and/or viewer profile data from multiple client devices of system 300. Anonymous data collection components 304 and 308 can be implemented as any data structure format to maintain the media access information, viewer or household profile data, and other associated information in any electronic data storage format.

Client device 108(1) includes one or more tuners 310 which are representative of one or more in-band tuners that tune to various frequencies or channels to receive television signals, as well as an out-of-band tuner that tunes to the broadcast channel over which the program data is broadcast to client device 108(1). Client device 108(1) also includes one or more processors 312 (e.g., microprocessors) which process various instructions to control the operation of client device 108(1) and to communicate with other electronic and computing devices.

Client device 108(1) can be implemented with one or more memory components, examples of which include a random access memory (RAM) 314, mass storage media 316, a disk drive 318, and a non-volatile memory 320 (e.g., ROM, Flash, EPROM, EEPROM, etc.). The memory components (e.g., RAM 314, storage media 316, disk drive 318, and non-volatile memory 320) store various information and/or data such as received content, program data, configuration information for client device 108(1), and/or graphical user interface information. Further, disk drive 318 maintains anonymous data collection component 304(A) when the anonymous data collection component is created by data collection application 302, and the disk drive maintains anonymous data collection components received from other client devices, such as anonymous data collection component 304(B).

Alternative implementations of client device 108(1) can include a range of processing and memory capabilities, and may include more or fewer types of memory components than those illustrated in FIG. 3. For example, full-resource clients can be implemented with substantial memory and processing resources, including the disk drive 318 to store anonymous data collection components. Low-resource clients, however, may have limited processing and memory capabilities, such as a limited amount of RAM 314 and limited processing capabilities of a processor 312.

An operating system 322 and one or more application programs 324 can be stored in non-volatile memory 320 and executed on a processor 312 to provide a runtime environment. A runtime environment facilitates extensibility of client device 108(1) by allowing various interfaces to be defined that, in turn, allow application programs 324 to interact with client device 108(1). The application programs 324 that may be implemented in client device 108(1) can include a browser to browse the Web (e.g., "World Wide Web"), an email program to facilitate electronic mail, and so on. A program guide application 326 is stored in memory 320 to operate on the program data and generate a program guide. Further, data collection application 302 can be implemented as a software component that executes on a processor 312 and is stored in non-volatile memory 312. Client device 108(1) can also include other components pertaining to a television-based entertainment system which are not illustrated in this example. For instance, client device 108(1) can include a user interface application and user interface lights, buttons, controls, and the like to facilitate viewer interaction with the device.

Client device 108(1) also includes a content processor and/or decoder 328 to process and decode a broadcast video signals, such as NTSC, PAL, SECAM, or other television system analog video signals, as well as a DVB, ATSC, ARIB, or other television system digital video signals. Content processor 328 can also include a video decoder and/or additional processors to receive, decode, and/or process video content received from network operator 306. For example, content processor 328 may include an MP3 or MPEG-2 (Moving Pictures Experts Group) decoder that decodes MPEG-encoded video and advertisement content. MPEG-2 supports a variety of audio/video formats, including legacy TV, HDTV (high-definition television), DVD (digital versatile disc), and five-channel surround sound.

Typically, video content includes video data and audio data that corresponds to the video data. Content processor 328 generates video and/or display content that is formatted for display on display device 128, and generates decoded audio data that is formatted for broadcast by a broadcast device, such as one or more speakers (not shown) in display device 128. Content processor 328 can include a display controller (not shown) that processes the video and/or display content to display corresponding images on display device 128. A display controller can include a microcontroller, integrated circuit, and/or similar video processing component to process the images. It is to be appreciated that the systems and methods described herein can be implemented for any type of encoding format as well as for data and/or content streams that are not encoded.

Client device 108(1) further includes a wireless interface 330, a network interface 332, a serial and/or parallel interface 334, and a PSTN, DSL, or cable modem 336. Wireless interface 330 allows client device 108(1) to receive input commands and other information from a user-operated input device, such as from a remote control device or from another IR, 802.11, Bluetooth, or similar RF input device.

Network interface 332 and serial and/or parallel interface 334 allows client device 108(1) to interact and communicate with other electronic and computing devices via various communication links. Although not shown, client device 108(1) may also include other types of data communication interfaces to communicate with other devices. Modem 336 facilitates client device 108(1) communication with other electronic and computing devices via a conventional telephone line, a DSL connection, or a cable modem.

Client device 108(1) also includes an audio and/or video output 338 that provides signals to television 128 or to other devices that process and/or display, or otherwise render, the audio and video data. Although shown separately, some of the components of client device 108(1) may be implemented in an application specific integrated circuit (ASIC). Additionally, a system bus (not shown) typically connects the various components within client device 108(1). A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Figure 4:
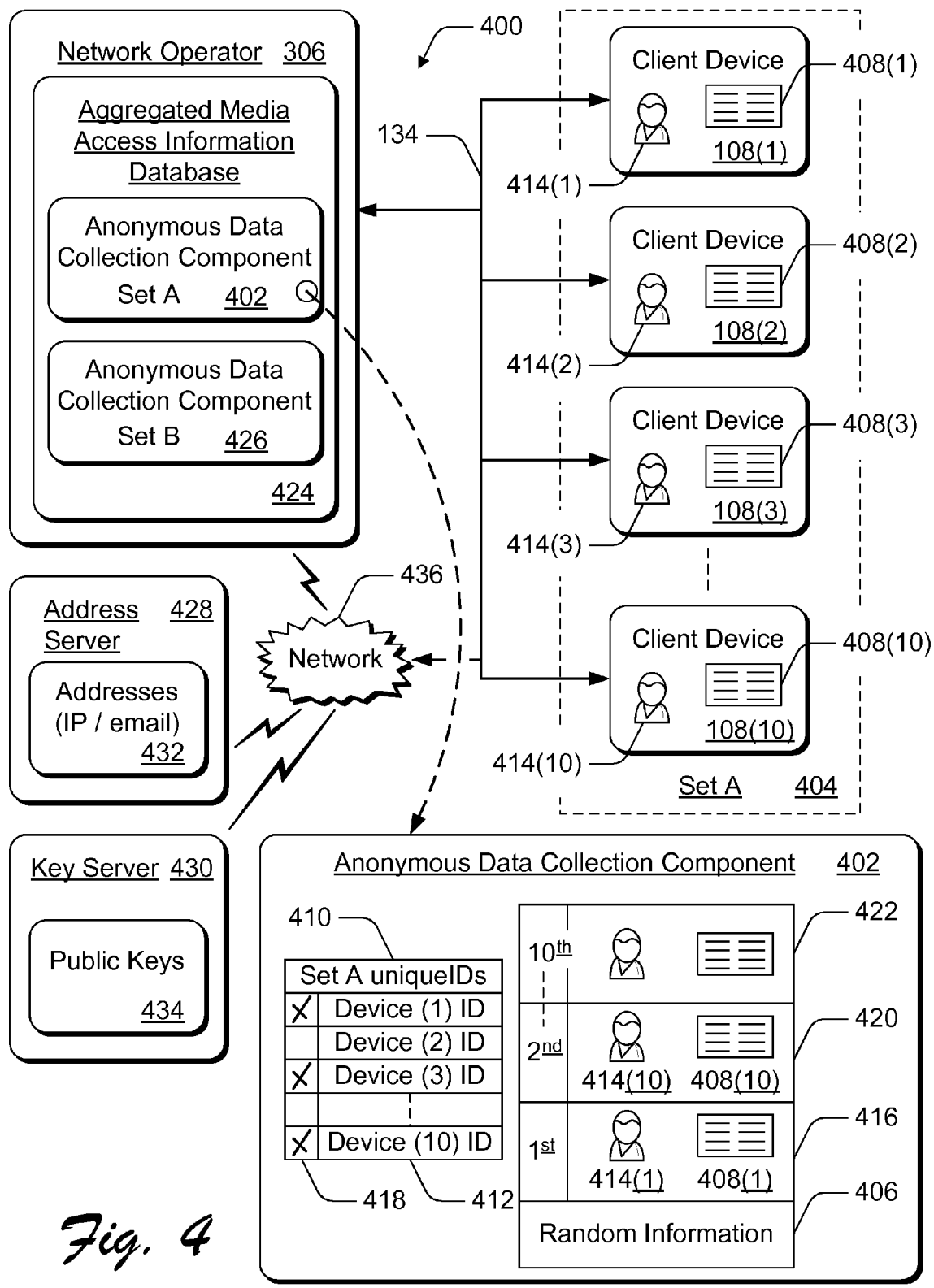
FIG. 4 illustrates an exemplary anonymous aggregated data collection system.

FIG. 4 illustrates an exemplary anonymous aggregated data collection system 400 that includes selected components of system 300 (FIG. 3), such as client devices 108 and a network operator 306. FIG. 4 also illustrates an anonymous data collection component 402 that corresponds to a first set 404 ("Set A") of client devices 108(1) through 108(10). Although a set of client devices is described and shown including ten randomly selected client devices, an anonymous data collection component can be implemented to aggregate media access information, such as content viewing data and/or viewer profile data, for any number of client devices connected in a television-based entertainment and information system.

It should be noted that randomly selected client devices can be selected from all client devices in a television-based entertainment and information system, or can be selected from smaller defined set of the client devices. A smaller defined set of the client devices can be randomly selected from a list of available recipients having a common demographic, such as client devices located in the same postal code, for example.

A first client device 108(1) can create the anonymous data collection component 402 to begin collecting media access information of the client devices 108(1) through 108(10) in the first set 404 of client devices. A data collection application 302 (FIG. 3) in client device 108(1) can be scheduled to create an anonymous data collection component at a random day and time once a week, every day at a pre-determined time, and/or on any other schedule. Additionally, network operator 306 can initiate that a client device create an anonymous data collection component, or the network operator can create an anonymous data collection component and route it to a client device to begin collecting media access information.

After creating or receiving a new anonymous data collection component, the data collection application 302 stores random media access information 406 in the anonymous data collection component 402. The random media access information 406 obscures any media access information 408(1) of client device 108(1) that might also be stored in the anonymous data collection component and which may be attributable to the client device when the anonymous data collection component is routed, or otherwise communicated, to another client device in the set 404 of client devices. The media access information can include such information as which broadcast channels were watched at what time and by which viewer. When network operator 306 receives an anonymous data collection component that has media access information from multiple client devices, the network operator can statistically eliminate the random information.

The data collection application 302 in client device 108(1) randomly selects a second client device in the set 404 of client devices to receive the anonymous data collection component 402. The second client device is randomly selected from a set of unique identifiers 410 for the set 404 ("Set A") of client devices. Each unique identifier 412 in the set of unique identifiers 410 corresponds to a client device 108 in the set 404 of client devices. A unique identifier 412 of a client device can include an email address, an Internet protocol (IP) address, or any other identifier that facilitates communicating the anonymous data collection component 402 from one client device to the next. Additionally, a unique identifier 412 can include a public key corresponding to a recipient client device so that a data collection application 302 can encrypt an anonymous data collection component to generate an encrypted data structure that is communicated to the recipient client device.

In this example, client device 108(1) creates the anonymous data collection component 402, stores the random media access information 406 in the anonymous data collection component, and stores media access information 408(1) and/or viewer profile data 414(1) in the anonymous data collection component 402 as the first ($1^{st}$) client device data 416. Client device 108(1) then randomly selects client device 108(10) to receive the anonymous data collection component. When client device 108(10) receives the anonymous data collection component 402, a data collection application 302 in client device 108(10) stores media access information 408(10) and/or viewer profile data 414(10) in the anonymous data collection component 402 as the second ($2^{nd}$) client device data 420. Further, the data collection application 302 in client device 108(10) indicates that client device 108(10) has received the anonymous data collection component 402 with a corresponding identifier 418 stored in the set of unique identifiers 410.

After the second ($2^{nd}$) client device data 420 is stored in the anonymous data collection component 402, the data collection application 302 in client device 108(10) randomly selects client device 108(3) to next receive the anonymous data collection component 402. When client device 108(3) receives the anonymous data collection component 402, a data collection application 302 in client device 108(3) stores media access information 408(3) and/or viewer profile data 414(3) in the anonymous data collection component 402 as the third ($3^{rd}$) client device data (not shown in component 402). Further, the data collection application 302 in client device 108(3) indicates that client device 108(3) has received the anonymous data collection component 402 with a corresponding identifier 418 stored in the set of unique identifiers 410.

The data collection application 302 in client device 108(3) determines from the set of unique identifiers 410 which client devices have not received the anonymous data collection component 402 and randomly selects a recipient client device to next receive the anonymous data collection component 402. In this example, client devices 108(2), and 108(4) through 108(9) have not received the anonymous data collection component 402. Each subsequent client device communicates the anonymous data collection component 402 to a next recipient client device until the last available client device in the set 404 of client devices has received the anonymous data collection component and stored the tenth ($10^{th}$) client device data 422 in the anonymous data collection component 402.

In an alternative implementation, each client device communicates the anonymous data collection component 402 to a next recipient client device selected at random from the set 404 of client devices. In this example, one or more of the client devices in a set of client devices may receive the anonymous data collection component more than once and store the associated media access information 408 and/or viewer profile data 414 in the anonymous data collection component 402. This further randomizes and obscures the source client device of any particular media access information and/or viewer profile data.

The last client device in the set 404 of client devices to receive the anonymous data collection component 402 routes the anonymous data collection component to the network operator 306 which includes an aggregated media access information database 424 to store anonymous data collection components from multiple sets of client devices. In this example, the aggregated media access information database includes the anonymous data collection component 402 which corresponds to set 404 ("Set A") of ten client devices 108, and includes an anonymous data collection component 426 that corresponds to a "Set B" of client devices (not shown). Network operator 306 can receive and maintain any number of anonymous data collection components corresponding to any number of client devices and sets of client devices in the aggregated media access information database 424. Further, any number of client devices may be included in more than one set of client devices at any one time, and any client device can both create an anonymous data collection component as well as maintain one or more received anonymous data collection components at any one time.

When the last client device in the set 404 of client devices receives the anonymous data collection component 402, and before the client device routes the anonymous data collection component to the network operator 306, the associated data collection application 302 in the client device can delete the set of unique identifiers 410 from the anonymous data collection component 402. This further prevents the network operator 306 from correlating the media access information 408 and/or the viewer profile data 414 of any one client device 108 with any one particular subscriber by comparing a unique identifier of a client device with subscription account information.

When a data collection application 302 in a client device 108 creates an anonymous data collection component, the client device can request the set of unique identifiers 410 from the network operator 306, and store the set of unique identifiers in the anonymous data collection component 402. Alternatively, the set of unique identifiers 410 can be maintained independently of the anonymous data collection component by the data collection application 302 in the associated client device 108.

Rather than obtain the set of unique identifiers 410 from the network operator 306, a client device 108 can request a unique identifier, such as an email address, Internet protocol (IP) address, silicon serial identifier, or other type of unique identifier from an address and/or identifier server 428. Additionally, a client device 108 can request a public key from a key server 430. The address server 428 maintains email and/or IP addresses 432 each corresponding to a client device 108, and the key server 430 maintains public keys 434 each corresponding to a client device 108. The client devices are communicatively linked with address server 428 and key server 430 via the back channel 134 and a data communication network 436 which can be any type of network, such as a local area network (LAN) or a wide area network (WAN), using any type of network topology and any network communication protocol. Although only a few devices are shown communicatively linked via network 436, such as client devices 108, network operator 306, address server 428, and key server 430, a typical network can have any number of devices connected to it, either directly or indirectly via another network system. The Internet is an example of multiple connected network systems each having multiple devices.

The associated data collection application 302 in each of the client devices in the set 404 of client devices can request a public key for a recipient client device that will next be receiving an anonymous data collection component. The collection application 302 can encrypt the anonymous data collection component with the client device public key to generate an encrypted data structure that is emailed, or otherwise communicated, to the recipient client device. In an anonymous aggregated data collection system having client devices 108 that are implemented to communicate with the headend (e.g., network operator 306), an encrypted data structure can be emailed from one client device to the next via the headend in a store-and-forward communication system. Alternatively, client devices 108 can be implemented in a peer-to-peer communication system and communicate an encrypted data structure directly from one client device to another.

In an alternative implementation, there can be one common public key and one common private key utilized by each client device in a set of client devices or within an anonymous aggregated data collection system. It should also be noted that any encryption and communication technique can be employed to encrypt an anonymous data collection component for communication to a recipient client device.

When the recipient client device receives the encrypted data structure (i.e., an encrypted anonymous data collection component), the associated data collection application 302 can decrypt the data structure with a private key and password corresponding to the recipient client device. A private key and password can be obtained from a file stored on the recipient client device and/or from login information obtained when a viewer logs into a television entertainment system. Additionally, a unique identifier, such as an IP address, can be obtained when a viewer logs into the system, either through a client device 108, or through another device connected with the system that provides a single login password for multiple accounts.

Methods for a Anonymous Aggregated Data Collection

Methods for an anonymous aggregated data collection system may be described in the general context of computer-executable instructions. Generally, computer-executable instructions include routines, programs, objects, components, data structures, and the like that perform particular functions or implement particular abstract data types. Methods for an anonymous aggregated data collection system may also be practiced in distributed computing environments where functions are performed by remote processing devices that are linked through a communications network. In a distributed computing environment, computer-executable instructions may be located in both local and remote computer storage media, including memory storage devices.

Figure 5:
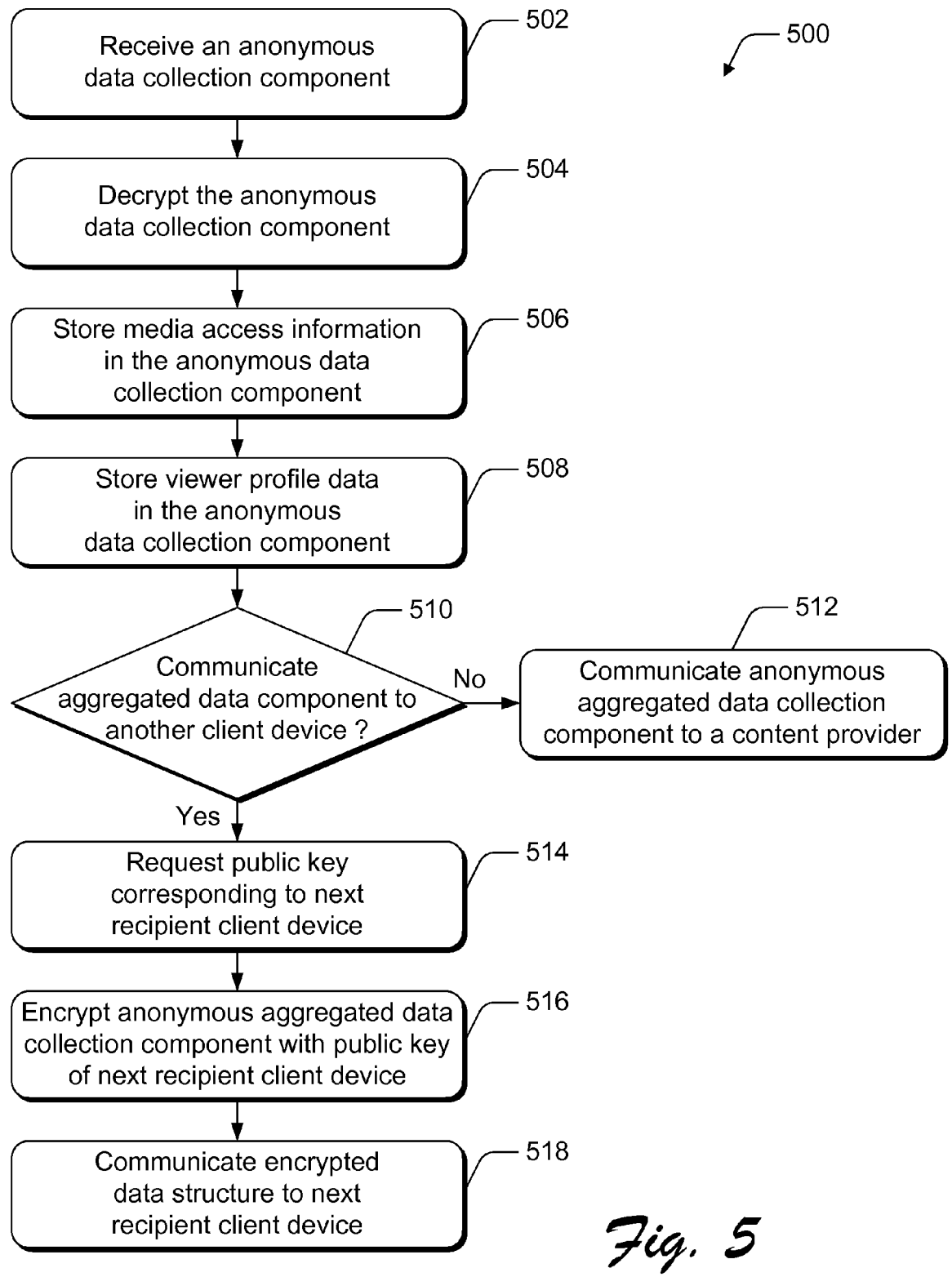
FIG. 5 is a flow diagram that illustrates a method for an anonymous aggregated data collection system.

FIG. 5 illustrates a method 500 for an anonymous aggregated data collection system. The order in which the method is described is not intended to be construed as a limitation, and any number of the described method blocks can be combined in any order to implement the method. Furthermore, the method can be implemented in any suitable hardware, software, firmware, or combination thereof.

At block 502, an anonymous data collection component is received. For example, client device 108(1) receives anonymous data collection component 402, either as a newly created anonymous data collection component from network operator 306, or as an anonymous data collection component that includes media access information from one or more client devices 108.

At block 504, the anonymous data collection component is decrypted with a private key and password. For example, client device 108(1) has a private key and corresponding password that an associated data collection application 302 uses to decrypt anonymous data collection components that have been encrypted with a public key corresponding to client device 108(1).

At block 506, media access information is stored in the anonymous data collection component. For example, data collection application 302 in client device 108(1) stores media access information 408(1) in the anonymous data collection component 402 which is aggregated with additional media access information 408(3) and 408(10) from other client devices 108(3) and 108(10). At block 508, viewer profile data is stored in the anonymous data collection component and is correlated with the media access information. For example, data collection application 302 in client device 108(1) stores viewer profile data 414(1) in the anonymous data collection component 402.

At block 510, a determination is made whether to communicate the anonymous aggregated data collection component to another client device. For example, data collection application 302 in client device 108(1) determines whether each of the client devices 108 in the set 404 of client devices has received the anonymous data collection component 402, and whether the corresponding media access information and/or viewer profile data of each of the client devices has been aggregated in the anonymous data collection component.

If the anonymous data collection component will not be communicated to another client device, (i.e., "no" from block 510), the anonymous aggregated data collection component is communicated to a content provider at block 512. This indicates that each of the client devices 108 in the set 404 of client devices has received the anonymous data collection component 402 and that the media access information 408 and/or viewer profile data 414 of each client device 108 has been aggregated in the anonymous data collection component 402.

If the anonymous aggregated data collection component will be communicated to another client device, (i.e., "yes" from block 510), a public key corresponding to the next recipient client device is requested from a key server at block 514. For example, data collection application 302 in client device 108(1) requests a public key 430 for the recipient client device 108(10) from key server 428 (or indirectly from network operator 306).

At block 516, the anonymous aggregated data collection component is encrypted with the public key corresponding to the next recipient client device to generate an encrypted data structure (i.e., an encrypted anonymous data collection component). At block 518, the encrypted data structure is communicated to the next recipient client device. For example, the client device 108(1) randomly selects client device 108(10) to receive the anonymous data collection component 402 and encrypts the anonymous data collection component 402 with a public key 434 that corresponds to client device 108(10) to generate an encrypted data structure that is communicated to the recipient client device 108(10).

Figure 6:
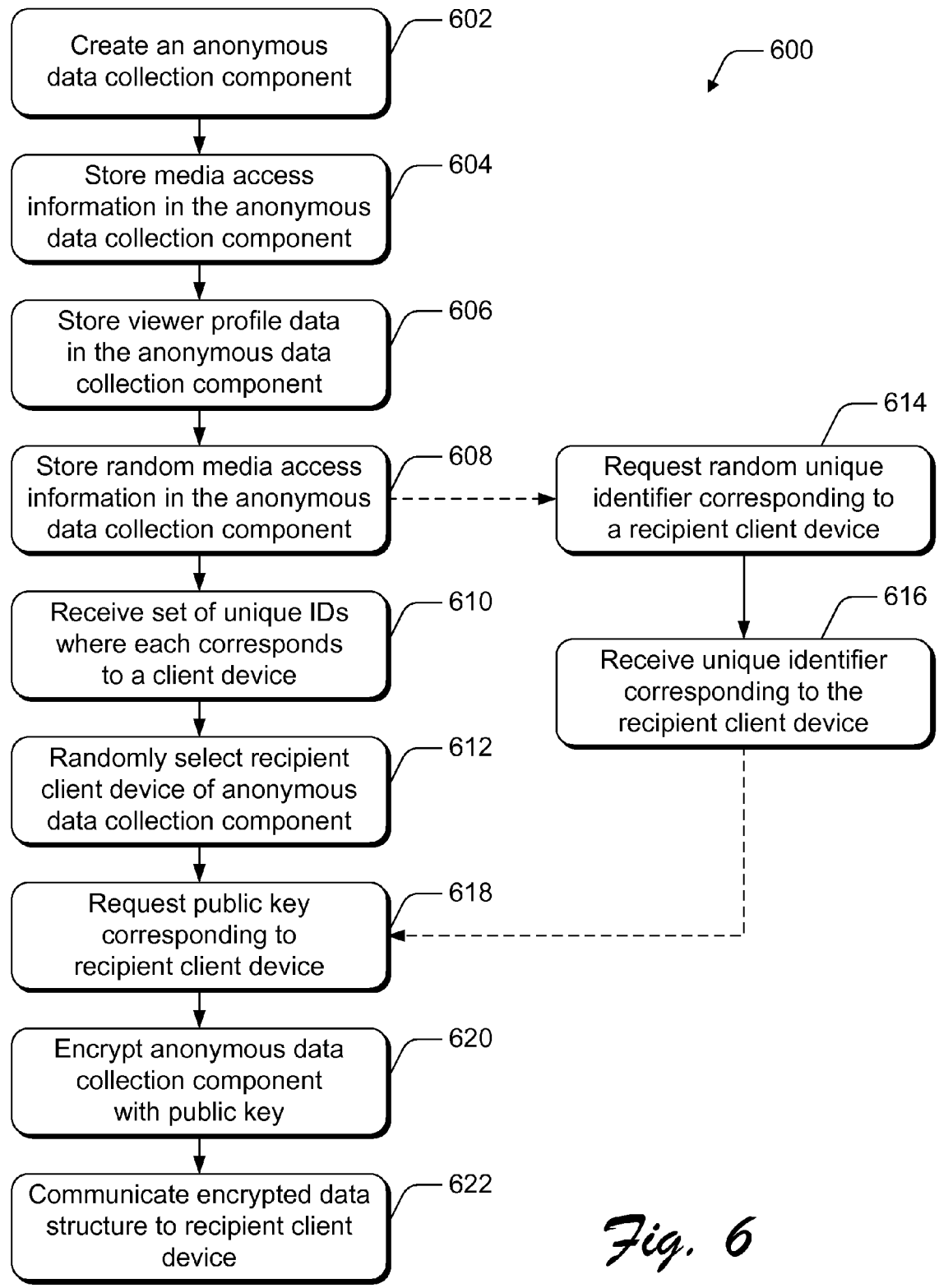
FIG. 6 is a flow diagram that illustrates a method for an anonymous aggregated data collection system.

FIG. 6 illustrates a method 600 for an anonymous aggregated data collection system. The order in which the method is described is not intended to be construed as a limitation, and any number of the described method blocks can be combined in any order to implement the method. Furthermore, the method can be implemented in any suitable hardware, software, firmware, or combination thereof.

At block 602, an anonymous data collection component is created to maintain aggregated media access information for one or more client devices. For example, a data collection application 302 in client device 108(1) creates an anonymous data collection component 402 to aggregate media access information 408 and/or viewer profile data 414 for each of the clients devices 108 in a set 404 of client devices.

At block 604, media access information is stored in the anonymous data collection component. As an alternative, or in addition to block 604, viewer profile data is stored in the anonymous data collection component at block 606, and as an alternative, or in addition to blocks 604 and 606, random media access information is stored in the anonymous data collection component to obscure the media access information at block 608. For example, data collection application 302 in client device 108(1) can store media access information 408(1), viewer profile data 414(1), and/or random media access information 406 in the anonymous data collection component 402.

At block 610, a set of unique identifiers is received where each unique identifier corresponds to a client device, and the set of unique identifiers is stored in the anonymous data collection component. For example, data collection application 302 in client device 108(1) receives the set of unique identifiers 410 from network operator 306, from key server 428, or from another similar and/or independent data source. The set of unique identifiers 410 is stored in anonymous data collection component 402 such that the set is then routed from one client device to another with the anonymous data collection component.

At block 612, a recipient client device is randomly selected to receive the anonymous data collection component. For example, data collection application 302 in client device 108(1) randomly selects recipient client device 108(10) from unique identifier 412 in the set of unique identifiers 410.

As an alternative to receiving a set of unique identifiers at block 610, and randomly selecting a recipient client device from the set of unique identifiers at block 612, a unique identifier is requested that corresponds to a random recipient client device at block 614, and at block 616, the unique identifier is received. For example, data collection application 302 in client device 108(1) can request a unique identifier that is an email or IP address for recipient client device 108(10) from an addresses database 432 in address server 428, or from network operator 306.

At block 618, a public key corresponding to the recipient client device is requested from a key server. For example, data collection application 302 in client device 108(1) requests a public key 434 for the recipient client device 108(10) from key server 430.

At block 620, the anonymous data collection component is encrypted with the public key corresponding to the recipient client device to generate an encrypted data structure (i.e., an encrypted anonymous data collection component). At block 622, the encrypted data structure is communicated to the recipient client device. For example, data collection application 302 in client device 108(1) encrypts the anonymous data collection component 402 with a public key 434 that corresponds to client device 108(10) to generate an encrypted data structure that is communicated to the recipient client device 108(10). The encrypted data structure is communicated to the recipient client device via an email or IP address corresponding to client device 108(10). The recipient client device 108(10) can decrypt the encrypted anonymous data collection component with a private key and a password corresponding to the client device 108(10).

CONCLUSION

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A data collection system comprising:
a first client device of a plurality of client devices each configured to receive content from a content provider, the first client device being configured to perform operations including:
receiving an anonymous data collection component from a second client device, the anonymous data collection component having aggregated media access information for at least the second client device;
storing media access information of the first client device in the anonymous data collection component, the media access information of the first client device being anonymous within the anonymous data collection component;
determining that one or more of the plurality of client devices has not received the anonymous data collection component; and
randomly selecting one of the plurality of client devices that has not received the anonymous data collection component to receive the anonymous data collection component such that the anonymous data collection component includes media access information for each of the plurality of client devices,
wherein the anonymous data collection component includes random media access information that was stored in the anonymous data collection component, the random media access information obscuring the media access information of one or more client devices that is already stored in the anonymous data collection component, wherein the random media access information is not associated with viewing behavior or viewers of any of the client devices and includes broadcast channels, times that content was viewed, and viewers that viewed content.

2. A data collection system as recited in claim 1, wherein the operations further include decrypting the anonymous data collection component.

3. A data collection system as recited in claim 1, wherein the operations further include decrypting the anonymous data collection component with a private key and password corresponding to the first client device.

4. A data collection system as recited in claim 1, wherein the operations further include storing viewer profile data associated with the first client device in the anonymous data collection component.

5. A data collection system as recited in claim 1, wherein the operations further include determining whether each client device identified in a set of unique identifiers has received the anonymous data collection component.

6. A data collection system as recited in claim 5, wherein the operations further include:
selecting randomly a third client device from the set of unique identifiers if the third client device has not received the anonymous data collection component;
encrypting the anonymous data collection component to generate an encrypted data structure with a public key corresponding to the third client device, the public key corresponding to the third client device being obtained from the set of unique identifiers; and
communicating the anonymous data collection component to the third client device.

7. A data collection system as recited in claim 5, wherein the operations further include:
communicating the anonymous data collection component to the content provider, the anonymous data collection component having aggregated media access information for each client device identified in the set of unique identifiers.

8. A data collection system as recited in claim 5, wherein the operations further include:
communicating the anonymous data collection component to the content provider if each client device identified in the set of unique identifiers has received the anonymous data collection component, the anonymous data collection component having aggregated media access information for each client device identified in the set of unique identifiers.

9. A data collection system as recited in claim 8, wherein the operations further include deleting the set of unique identifiers from the anonymous data collection component before the anonymous data collection component is communicated to the content provider.

10. A television-based entertainment system comprising the data collection system as recited in claim 1.

11. A digital video recording system comprising the data collection system as recited in claim 1.

12. A personal video recording system comprising the data collection system as recited in claim 1.

13. A data collection system comprising:
client devices each configured to receive content from a content provider and execute a data collection application;
each data collection application configured to:
receive an anonymous data collection component from a client device;
store media access information of a corresponding client device associated with the data collection application in the anonymous data collection component, the anonymous data collection component having aggregated media access information for one or more of the client devices, the aggregated media access information being configured to maintain anonymity of the client devices from which each of the media access information is received; and store random media access information in the anonymous data collection component to obscure the media access information of the corresponding client device and the media access information of any one or more client devices that is already stored in the anonymous data collection component, wherein the random media access information is not associated with viewing behavior or viewers of any of the client devices and a portion of information within the random media access information of the corresponding client device and the one or more client devices is statistically eliminated by a network operator upon receipt of the anonymous data collection component by the network operator.

14. A data collection system as recited in claim 13, wherein each data collection application is further configured to decrypt the anonymous data collection component.

15. A data collection system as recited in claim 13, wherein each data collection application is further configured to decrypt the anonymous data collection component with a private key and password of the corresponding client device.

16. A data collection system as recited in claim 13, wherein:

each data collection application is further configured to store viewer profile data associated with the corresponding client device in the anonymous data collection component, and the anonymous data collection component is further configured to maintain aggregated viewer profile data corresponding to the aggregated media access information.

17. A television-based entertainment system comprising the data collection system as recited in claim 13.

18. A digital video recording system comprising the data collection system as recited in claim 13.

19. A personal video recording system comprising the data collection system as recited in claim 13.

20. A computer-implemented method for anonymously collecting data, comprising:

receiving an anonymous data collection component;

storing media access information in the anonymous data collection component, the media access information being aggregated with additional media access information from one or more client devices and configured to maintain anonymity of the one or more client devices from which the media access information is received;

storing random media access information in the anonymous data collection component to obscure the media access information of the one or more client devices that is already stored in the anonymous data collection component, the anonymous data collection component being received by at least one of the one or more client devices multiple times and random media access information being added to the anonymous data collection component each time the anonymous data collection component is received to further randomize and obscure the media access information associated with the one or more client devices, wherein the random media access information is not associated with viewing behavior or viewers of any of the client devices and includes broadcast channels, times that content was viewed, and viewers that viewed content; and determining whether to communicate the anonymous data collection component to a client device.

21. A method for anonymously collecting data as recited in claim 20, further comprising storing viewer profile data in the anonymous data collection component, and correlating the viewer profile data with the media access information.

22. A method for anonymously collecting data as recited in claim 20, further comprising decrypting the anonymous data collection component.

23. A method for anonymously collecting data as recited in claim 20, further comprising decrypting the anonymous data collection component with a private key and password.

24. A method for anonymously collecting data as recited in claim 20, wherein determining includes determining whether each of the one or more client devices has received the anonymous data collection component and the media access information of each of the one or more client devices has been aggregated in the anonymous data collection component.

25. A method for anonymously collecting data as recited in claim 20, further comprising communicating the anonymous data collection component to a content provider if each of the one or more client devices has received the anonymous data collection component and the media access information of each of the one or more client devices has been aggregated in the anonymous data collection component.

26. A method for anonymously collecting data as recited in claim 20, further comprising communicating the anonymous data collection component to the client device if the client device has not received the anonymous data collection component.

27. A method for anonymously collecting data as recited in claim 20, further comprising encrypting the anonymous data collection component with a public key corresponding to the client device to generate an encrypted data structure, and communicating the encrypted data structure to the client device if the client device has not received the anonymous data collection component.

28. A method for anonymously collecting data as recited in claim 27, further comprising requesting the public key corresponding to the client device from a key server.

29. A digital video recording system, comprising:
one or more processors; and
computer-executable instructions that, when executed by the one or more processors, cause the one or more processors to perform the method of claim 20.

* * * * *